Dec. 27, 1955    B. W. ERIKSON    2,728,879
ELECTRICAL COIL
Filed Nov. 18, 1950
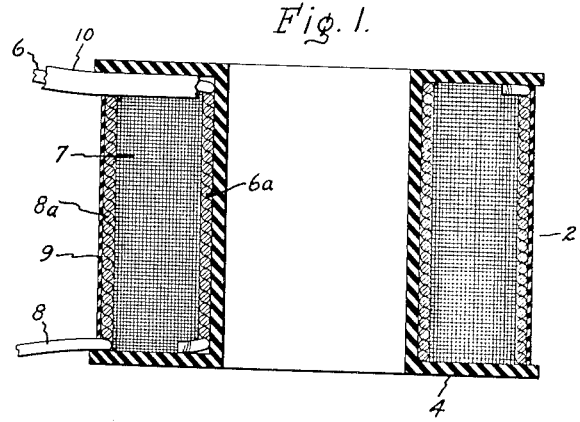
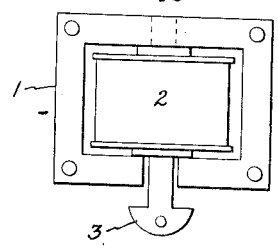
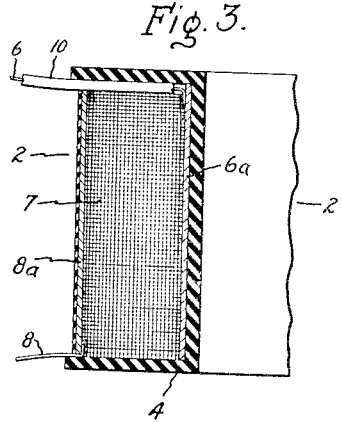
Inventor:
Bror W. Erikson,
by
His Attorney.

United States Patent Office 2,728,879
Patented Dec. 27, 1955

2,728,879

ELECTRICAL COIL

Bror W. Erikson, Schenectady, N. Y., assignor to General Electric Company, a corporation of New York Application November 18, 1950, Serial No. 196,468

2 Claims. (Cl. 317—158)

My invention relates to electrical coils and, more particularly, to electromagnet coils especially suitable for direct current applications.

It has been found that when insulated coils of copper wire are mounted upon a magnetizable iron core in close proximity to the iron and are energized from a direct current source with positive polarity on the copper element and no current flowing, a serious ground leakage problem frequently occurs when the coil is subjected to high humidity conditions. The reason for this is that the high moisture content of the surrounding air, taken in conjunction with impurities in the coil insulation or in the atmosphere, provides an electrolytic conduction path between the copper of the coil and the iron of the magnet core. With the copper element positive, galvanic current will then flow from the coil wires through the insulation and to the iron core. Such galvanic currents sometimes carry away so much copper from the coil that the coil wires are ruptured and the circuit interrupted. Many attempts have been made to protect against these conditions by the use of various coil coating compounds intended to render the coil moistureproof, but such attempts have not been entirely successful.

Accordingly, therefore, it is a general object of my invention to provide new and improved means for protecting an electrical coil, and particularly an electrical magnet coil, against deterioration by ground leakage currents under high humidity conditions.

It is a further object of my invention to provide new and improved means for rendering ground leakage currents from a direct current magnet coil impotent to damage the coil.

In carrying out my invention in one form, a coil formed of a plurality of turns of fine insulated wire is provided at its ends with lengths of heavier uninsulated wire. These terminal leads are wound on the inside and outside surfaces of the coil annulus, respectively, thereby to form substantially continuous conducting layers overlying the inner and outer peripheral surfaces of the annulus and constituting terminal conductors for the coil. Suitable ground insulation layers are wrapped over the otherwise uninsulated terminal layers. When such a structure is subjected to direct current electrolytic leakage conditions, the current leakage takes place primarily from the outer layers of uninsulated terminal wire, rather than from the fine coil wires themselves. The coil wires are thus protected against electrolytic reduction.

My invention itself will be more fully understood and its various objects and advantages further appreciated by referring now to the following detailed specification taken in conjunction with the accompanying drawing, in which Fig. 1 is a diametrical cross-sectional view of an electrical coil embodying my invention; Fig. 2 is a side elevational view of an electromagnet illustrating a typical application of such a coil; and Fig. 3 is a diametrical cross-sectional view of an electrical coil embodying my invention in another form.

Referring now to the drawing, I have shown at Fig. 2 a typical electromagnet of the solenoid type having a C-shaped magnetizable frame 1 within the central opening of which is positioned an energizing coil 2. A movable magnetizable plunger 3 is positioned for axial movement into and out of the coil 2 through the side opening in the frame 1.

At Fig. 1, I have shown an enlarged cross-sectional view of the electromagnet coil 2 of Fig. 2 in a preferred form. This coil comprises a spool 4, preferably formed of a suitable molded electric insulating material and having an axial opening or passageway therethrough. If the spool 4 is of metal, it may be provided with end washers and an axial wrapping of sheet insulating material, such as varnish impregnated cloth or paper or the like, prior to winding the coil thereon.

Over the spool body and between the end flanges there is wound a coil annulus comprising an underlayer 6a of relatively large and uninsulated, or bare, terminal or lead wire 6, one end of which is brought out of the coil. The terminal layer 6a thus comprises a plurality of contiguous turns of relatively large uninsulated wire in side by side electric conducting relation forming a substantially continuous conductive shield at terminal potential overlying the spool body. Over the inner or terminal layer 6a of bare wire there is wound a coil formed of a plurality of turns of fine insulated coil wire 7, one end of which is connected to the terminal layer 6a. The coil wire 7 is insulated with a suitable covering of insulating varnish, enamel, paper, glass, silk, or the like. Preferably, however, I use wire coated with a phenolaldehyde modified-polyvinyl acetol resin enamel. The wire 7 may be wound either in random manner or in layers, and, if desired, interlayer insulation of suitable sheet insulating material may be used. Finally, the outer peripheral surface of the coil annulus is formed as a terminal layer 8a of relatively large bare or uninsulated terminal wire 8, one end of which is brought out of the coil. The outer terminal layer 8a thus comprises a plurality of contiguous turns of relatively large uninsulated wire in side by side electric conducting relation forming a substantially continuous conductive shield at terminal potential overlying the outer peripheral surface of the coil wire 7. The other end of the coil wire 7 is connected to the terminal layer 8a. Over the outer uninsulated terminal layer 8a there is applied a suitable covering layer 9 of ground insulation, such as varnish impregnated paper, cloth, or the like. The ends of the uninsulated lead or terminal wires 6 and 8 are brought out of the coil, as indicated in the drawing, for connection to other electrical apparatus, care being exercised, of course, that the two terminal wires are insulated from each other. For this latter purpose, the lead wire 6 is shown provided with an insulating sleeve 10 where it is close to the terminal layer 8a.

At Fig. 3, I have illustrated another embodiment of my invention wherein the uninsulated electric conducting terminal layers 6a and 8a, encasing the inner and outer peripheral surfaces of the coil annulus, respectively, are formed of integral sheets of electric conducting material, such as copper, aluminum, or the like, to which the external lead wires 6 and 8 are connected. It will be understood that opposite ends of the fine insulated coil wire 7 are connected to the conducting sheets 6a and 8a, respectively, and that in all other respects the coil of Fig. 3 is wound in the same manner as that of Fig. 1, like parts having been assigned to the same reference numerals.

It will be understood that, if desired, layers of sheet insulating material may be placed between the coil wire 7 and the terminal layers 6a and 8a.

While I have described only certain preferred embodiments of my invention by way of illustration, many other modifications will occur to those skilled in the art, and I, therefore, wish to have it understood that I intend in the appended claims to cover all such modifications as fall within the true spirit and scope of my invention.

What I claim as new and desire to secure by Letters Patent of the United States is:

1. An electrical coil for use with a grounded magnetizable core comprising, an annulus formed of a plurality of turns of fine insulated coil wire, said annulus having inner and outer peripheral surfaces, and a continuous terminal lead of relatively larger uninsulated wire having one end connected internally to one end of said coil wire and having its other end extending outside said annulus for terminal connection, said terminal lead being wound between its ends in a plurality of contiguous turns in side by side electric conducting engagement overlying said inner peripheral surface, whereby said uninsulated terminal lead provides a substantially continuous conductive shield at terminal potential overlying a coil surface subject to electrolytic ground leakage current.

2. An electric coil for use with a grounded magnetizable core comprising, an annulus formed of a plurality of turns of fine insulated coil wire, said annulus having inner and outer peripheral surfaces, and a pair of terminal leads connected respectively to opposite ends of said coil wire and each comprising a single continuous length of relatively larger uninsulated wire having one end connected internally to one end of said coil wire and the other end brought out of said coil for terminal connection, said uninsulated terminal leads being wound each in a plurality of contiguous turns in side by side electric conducting relation overlying said inner and outer peripheral surfaces respectively, whereby said terminal leads are connected in series circuit relation with said coil and each provides a substantially continuous conductive shield at terminal potential overlying a coil surface subject to electrolytic ground leakage current.

References Cited in the file of this patent

UNITED STATES PATENTS

| | | |
|---|---|---|
| 1,326,223 | Thordarson | Dec. 30, 1919 |
| 1,352,360 | Dwyer | Sept. 7, 1920 |
| 1,695,122 | Phillips | Dec. 11, 1928 |
| 1,837,245 | Wheeler | Dec. 22, 1931 |
| 2,130,824 | Jones | Sept. 20, 1938 |
| 2,165,582 | Scofield | July 11, 1939 |

FOREIGN PATENTS

| | | |
|---|---|---|
| 561,950 | Great Britain | June 12, 1944 |